(12) United States Patent
Miwa

(10) Patent No.: US 6,853,917 B2
(45) Date of Patent: Feb. 8, 2005

(54) GPS NAVIGATION APPARATUS

(75) Inventor: Yohei Miwa, Yokohama (JP)

(73) Assignee: Vertex Standard Co., Ltd., Tokyo (JP)

( * ) Notice: Subject to any disclaimer, the term of this patent is extended or adjusted under 35 U.S.C. 154(b) by 0 days.

(21) Appl. No.: 10/788,925

(22) Filed: Feb. 26, 2004

(65) Prior Publication Data

US 2004/0167715 A1 Aug. 26, 2004

Related U.S. Application Data

(63) Continuation of application No. 10/228,534, filed on Aug. 27, 2002.

(30) Foreign Application Priority Data

Aug. 28, 2001 (JP) ........................................ 2001-258529

(51) Int. Cl.$^7$ ............................................... G01C 21/34
(52) U.S. Cl. ....................... 701/213; 701/206; 701/209; 342/357.06
(58) Field of Search ................................ 701/213, 209, 701/210, 211, 202, 206; 340/995.19, 995.24; 342/357.06, 357.07, 357.13

(56) References Cited

U.S. PATENT DOCUMENTS

| | | | | |
|---|---|---|---|---|
| 4,563,685 A | * | 1/1986 | Matsumoto et al. | ... 340/995.21 |
| 5,543,802 A | * | 8/1996 | Villevieille et al. | .... 342/357.06 |
| 5,546,092 A | * | 8/1996 | Kurokawa et al. | ..... 342/357.06 |
| 6,047,235 A | * | 4/2000 | Hiyokawa et al. | .......... 701/201 |
| 6,115,655 A | * | 9/2000 | Keith et al. | .................... 701/35 |
| 6,199,010 B1 | * | 3/2001 | Richton | ...................... 701/206 |
| 6,321,158 B1 | * | 11/2001 | DeLorme et al. | ........... 701/201 |
| 6,459,987 B1 | * | 10/2002 | Krull et al. | ................. 701/213 |
| 6,765,528 B2 | * | 7/2004 | Tranchina et al. | ....... 342/357.1 |
| 2002/0107635 A1 | * | 8/2002 | Katayama et al. | .......... 701/207 |

* cited by examiner

*Primary Examiner*—Michael J. Zanelli
(74) *Attorney, Agent, or Firm*—Fulwider, Patton, Lee & Utecht, LLP

(57) ABSTRACT

In a GPS navigation apparatus, a procedure of preparation of route for navigation using a specific point (WAY-POINT or MARK-POINT) established and registered by the tracking function is simplified. A TRACK list picture is read out from a MENU picture by the predetermined operation, and a desired TRACK name is designated from the list. When a type the specific point is selected by the predetermined operation to designate conversion from the TRACK to a ROUTE, position data of the START POINT, the specific point of the selected type, and the DESTINATION POINT, of the designated TRACK name are extracted, and interpolation data connecting the positions by straight line in the time series sequence is produced to construct a ROUTE for navigation. Conventionally, the selection has been made by each POINT unit, however, an automatic conversion in a batch in a TRACK unit is employed, and thus a route creating operation is extremely simplified.

12 Claims, 16 Drawing Sheets

FIG. 1
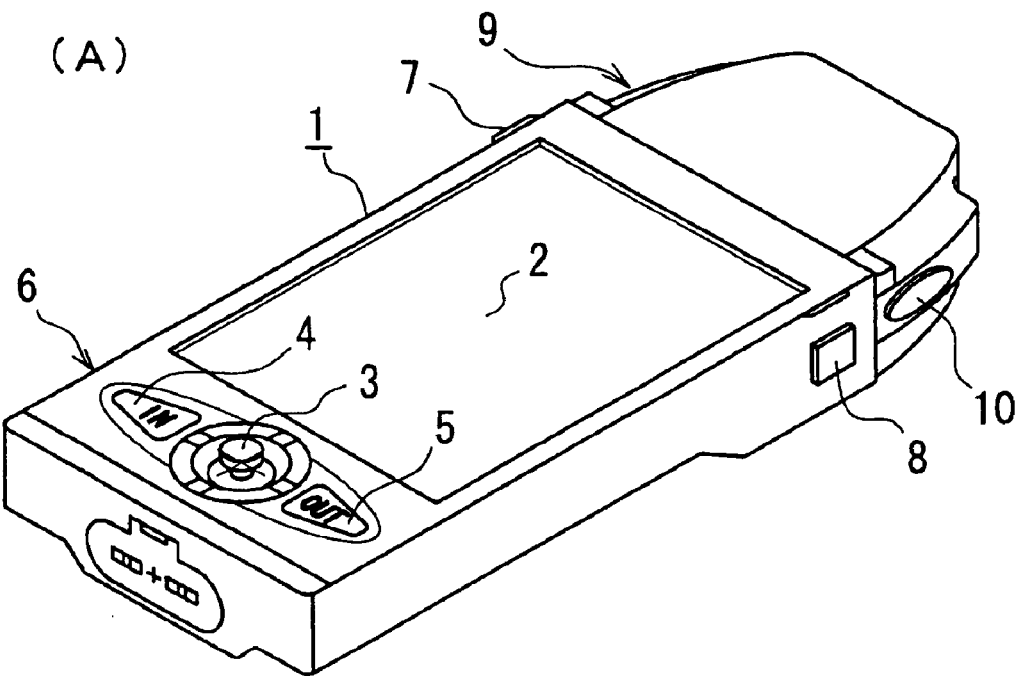
(A)
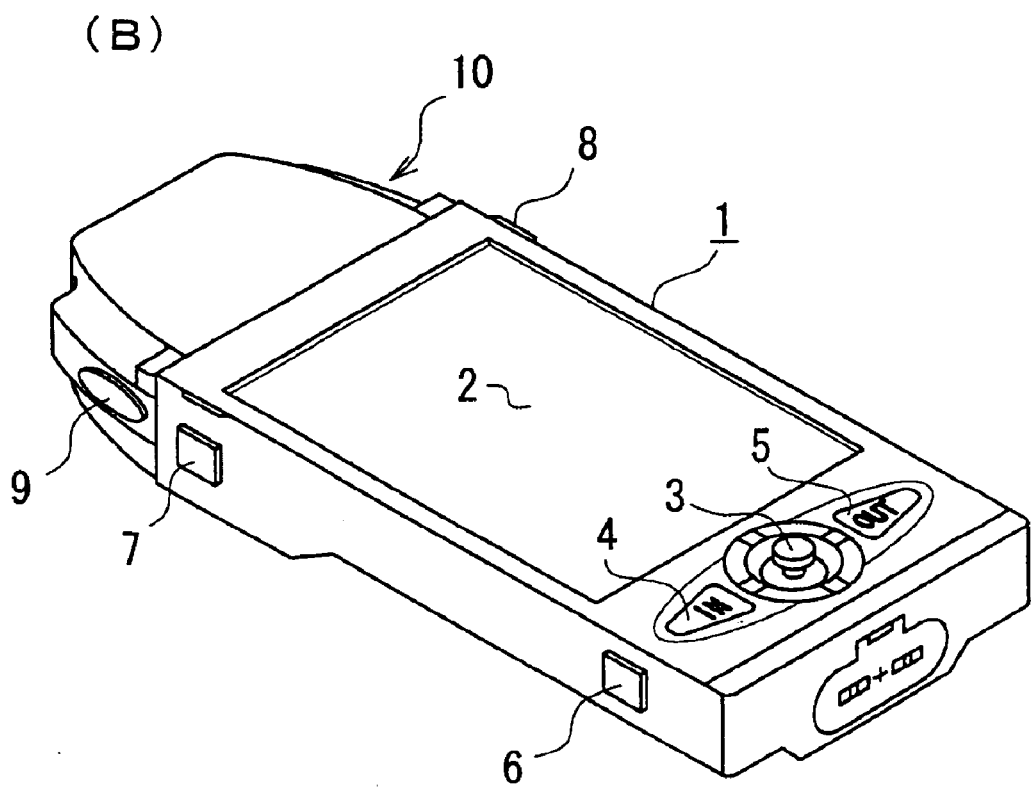
(B)

FIG. 6

| NAME OF TRACK | SAGAMI-A | | |
|---|---|---|---|
| NAME OF POINT | ICON | LATITUDE | LONGITUDE | ELEVATION |
| START | I-00 | $D_{Slat}$ | $D_{Slon}$ | $D_{Sele}$ |
| TD00001 | | $D_{lat00001}$ | $D_{lon00001}$ | $D_{ele00001}$ |
| TD00002 | | $D_{lat00002}$ | $D_{lon00002}$ | $D_{ele00002}$ |
| TD00003 | | $D_{lat00003}$ | $D_{lon00003}$ | $D_{ele00003}$ |
| ⋮ | | ⋮ | ⋮ | ⋮ |
| TD00062 | | $D_{lat00062}$ | $D_{lon00062}$ | $D_{ele00062}$ |
| WP001 | I-11 | $D_{Wlat001}$ | $D_{Wlon001}$ | $D_{Wele001}$ |
| TD00063 | | $D_{lat00063}$ | $D_{lon00063}$ | $D_{ele00063}$ |
| ⋮ | | ⋮ | ⋮ | ⋮ |
| TD00111 | | $D_{lat00111}$ | $D_{lon00111}$ | $D_{ele00111}$ |
| MP001 | I-10 | $D_{Mlat001}$ | $D_{Mlon001}$ | $D_{Mele001}$ |
| TD00112 | | $D_{lat00112}$ | $D_{lon00112}$ | $D_{ele00112}$ |
| ⋮ | | ⋮ | ⋮ | ⋮ |
| TD00142 | | $D_{lat00142}$ | $D_{lon00142}$ | $D_{ele00142}$ |
| WP002 | I-11 | $D_{Wlat002}$ | $D_{Wlon002}$ | $D_{Wele002}$ |
| TD00143 | | $D_{lat00143}$ | $D_{lon00143}$ | $D_{ele00143}$ |
| ⋮ | | ⋮ | ⋮ | ⋮ |
| TD00594 | | $D_{lat00594}$ | $D_{lon00594}$ | $D_{ele00594}$ |
| WP006 | I-11 | $D_{Wlat006}$ | $D_{Wlon006}$ | $D_{Wele006}$ |
| TD00595 | | $D_{lat00595}$ | $D_{lon00595}$ | $D_{ele00595}$ |
| ⋮ | | ⋮ | ⋮ | ⋮ |
| TD00681 | | $D_{lat00681}$ | $D_{lon00681}$ | $D_{ele00681}$ |
| MP003 | I-10 | $D_{Mlat003}$ | $D_{Mlon003}$ | $D_{Mele003}$ |
| TD00682 | | $D_{lat00682}$ | $D_{lon00682}$ | $D_{ele00682}$ |
| ⋮ | | ⋮ | ⋮ | ⋮ |
| TD00785 | | $D_{lat00785}$ | $D_{lon00785}$ | $D_{ele00785}$ |
| TD00786 | | $D_{lat00786}$ | $D_{lon00786}$ | $D_{ele00786}$ |
| DESTINATION | I-01 | $D_{dlat}$ | $D_{dlon}$ | $D_{dele}$ |

FIG. 9
(A)
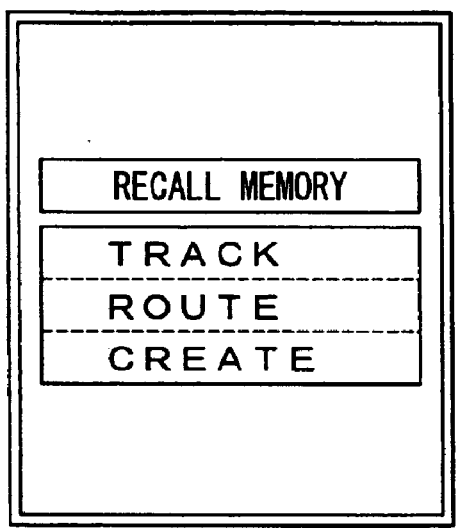
(B)
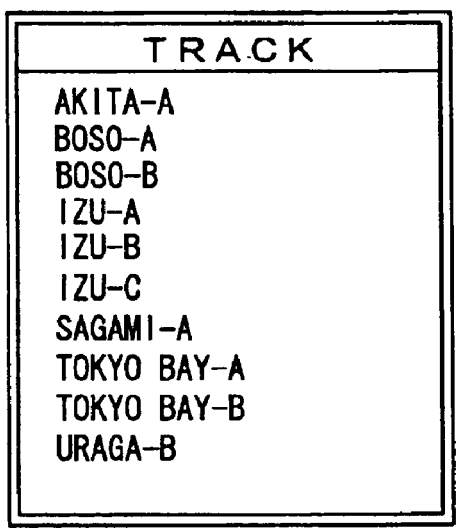
(C)
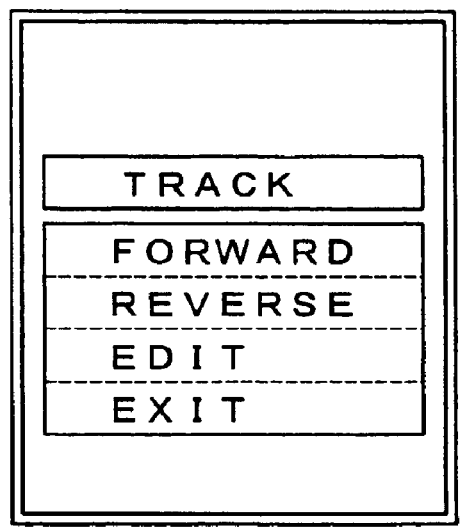
(D)
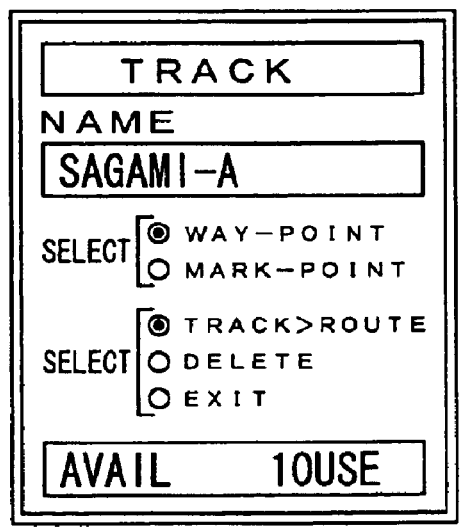

FIG. 10

| NAME OF TRACK | SAGAMI-A | | | |
|---|---|---|---|---|
| NAME OF POINT | ICON | LATITUDE | LONGITUDE | ELEVATION |
| START | I-00 | $DS_{lat}$ | $DS_{lon}$ | $DS_{ele}$ |
| | | (STRAIGHT LINE INTERPOLATION DATA BETWEEN START AND WP001) | | |
| WP001 | I-11 | $DW_{lat001}$ | $DW_{lon001}$ | $DW_{ele001}$ |
| | | (STRAIGHT LINE INTERPOLATION DATA BETWEEN WP001 AND WP002) | | |
| WP002 | I-11 | $DW_{lat002}$ | $DW_{lon002}$ | $DW_{ele002}$ |
| | | (STRAIGHT LINE INTERPOLATION DATA BETWEEN WP002 AND WP003) | | |
| WP003 | I-11 | $DW_{lat003}$ | $DW_{lon003}$ | $DW_{ele003}$ |
| | | (STRAIGHT LINE INTERPOLATION DATA BETWEEN WP003 AND WP004) | | |
| WP004 | I-11 | $DW_{lat004}$ | $DW_{lon004}$ | $DW_{ele004}$ |
| | | (STRAIGHT LINE INTERPOLATION DATA BETWEEN WP004 AND WP005) | | |
| WP005 | I-11 | $DW_{lat005}$ | $DW_{lon005}$ | $DW_{ele005}$ |
| | | (STRAIGHT LINE INTERPOLATION DATA BETWEEN WP005 AND WP006) | | |
| WP006 | I-11 | $DW_{lat006}$ | $DW_{lon006}$ | $DW_{ele006}$ |
| | | (STRAIGHT LINE INTERPOLATION DATA BETWEEN WP006 AND DESTINATION) | | |
| DESTINATION | I-01 | $Dd_{lat}$ | $Dd_{lon}$ | $Dd_{ele}$ |

FIG. 11

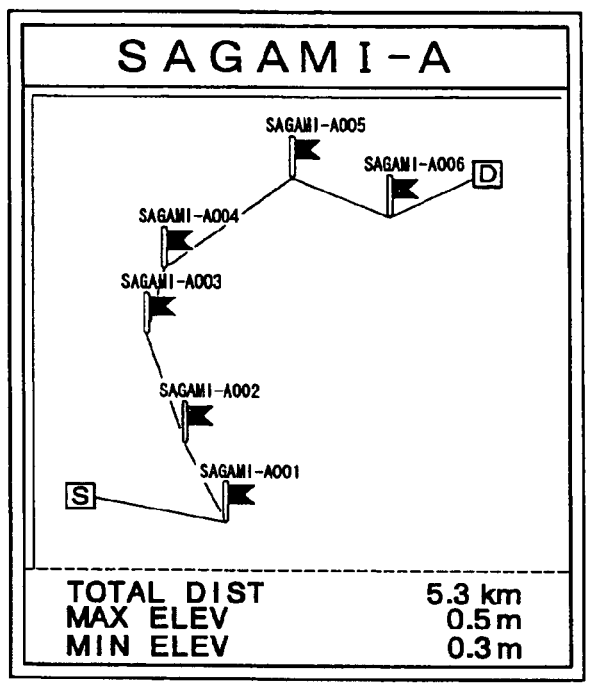

FIG. 12

| NAME OF TRACK | SAGAMI-A | | | |
|---|---|---|---|---|
| NAME OF POINT | ICON | LATITUDE | LONGITUDE | ELEVATION |
| START | I-00 | $D_{Slat}$ | $D_{Slon}$ | $D_{Sele}$ |
| | | (STRAIGHT LINE INTERPOLATION DATA BETWEEN START AND MP001) | | |
| MP001 | I-10 | $D_{mlat001}$ | $D_{mlon001}$ | $D_{mele001}$ |
| | | (STRAIGHT LINE INTERPOLATION DATA BETWEEN MP001 AND MP002) | | |
| MP002 | I-10 | $D_{mlat002}$ | $D_{mlon002}$ | $D_{mele002}$ |
| | | (STRAIGHT LINE INTERPOLATION DATA BETWEEN MP002 AND MP003) | | |
| MP003 | I-10 | $D_{mlat003}$ | $D_{mlon003}$ | $D_{mele003}$ |
| | | (STRAIGHT LINE INTERPOLATION DATA BETWEEN MP003 AND DESTINATION) | | |
| DESTINATION | I-01 | $D_{dlat}$ | $D_{dlon}$ | $D_{dele}$ |

FIG. 21

| NAME OF TRACK | SAGAMI-A | | | |
|---|---|---|---|---|
| NAME OF POINT | ICON | LATITUDE | LONGITUDE | ELEVATION |
| START | I-00 | $D_{Slat}$ | $D_{Slon}$ | $D_{Sele}$ |
| | | (STRAIGHT LINE INTERPOLATION DATA BETWEEN START AND WP001) | | |
| WP001 | I-11 | $D_{Wlat001}$ | $D_{Wlon001}$ | $D_{Wele001}$ |
| | | (STRAIGHT LINE INTERPOLATION DATA BETWEEN WP001 AND WP002) | | |
| WP002 | I-11 | $D_{Wlat002}$ | $D_{Wlon002}$ | $D_{Wele002}$ |
| | | (STRAIGHT LINE INTERPOLATION DATA BETWEEN WP002 AND WP006) | | |
| WP006 | I-11 | $D_{Wlat006}$ | $D_{Wlon006}$ | $D_{Wele006}$ |
| | | (STRAIGHT LINE INTERPOLATION DATA BETWEEN WP006 AND WP003) | | |
| WP003 | I-11 | $D_{Wlat003}$ | $D_{Wlon003}$ | $D_{Wele003}$ |
| | | (STRAIGHT LINE INTERPOLATION DATA BETWEEN WP003 AND WP004) | | |
| WP004 | I-11 | $D_{Wlat004}$ | $D_{Wlon004}$ | $D_{Wele004}$ |
| | | (STRAIGHT LINE INTERPOLATION DATA BETWEEN WP004 AND WP005) | | |
| WP005 | I-11 | $D_{Wlat005}$ | $D_{Wlon005}$ | $D_{Wele005}$ |
| | | (STRAIGHT LINE INTERPOLATION DATA BETWEEN WP005 AND DESTINATION) | | |
| DESTINATION | I-01 | $D_{dlat}$ | $D_{dlon}$ | $D_{dele}$ |

FIG. 22

| NAME OF TRACK | SAGAMI-A | | | |
|---|---|---|---|---|
| NAME OF POINT | ICON | LATITUDE | LONGITUDE | ELEVATION |
| START | I-00 | $D_{Slat}$ | $D_{Slon}$ | $D_{Sele}$ |
| | | (STRAIGHT LINE INTERPOLATION DATA BETWEEN START AND MP001) | | |
| MP001 | I-10 | $Dm_{lat001}$ | $Dm_{lon001}$ | $Dm_{ele001}$ |
| | | (STRAIGHT LINE INTERPOLATION DATA BETWEEN MP001 AND MP003) | | |
| MP003 | I-10 | $Dm_{lat003}$ | $Dm_{lon003}$ | $Dm_{ele003}$ |
| | | (STRAIGHT LINE INTERPOLATION DATA BETWEEN MP003 AND MP002) | | |
| MP002 | I-10 | $Dm_{lat002}$ | $Dm_{lon002}$ | $Dm_{ele002}$ |
| | | (STRAIGHT LINE INTERPOLATION DATA BETWEEN MP002 AND DESTINATION) | | |
| DESTINATION | I-01 | $Dd_{lat}$ | $Dd_{lon}$ | $Dd_{ele}$ |

FIG. 23

| POINT |
|---|
| IZU-C005 |
| IZU-CDES |
| SAGAMI-ASTA |
| SAGAMI-A001 |
| SAGAMI-A002 |
| SAGAMI-A003 |
| SAGAMI-A004 |
| SAGAMI-A005 |
| SAGAMI-A006 |
| SAGAMI-ADES |
| SAGAMI-AM001 |
| SAGAMI-AM002 |
| SAGAMI-AM003 |
| TOKYO BAY-ASTA |
| TOKYO BAY-A001 |

PRIOR ART

GPS NAVIGATION APPARATUS

This is a continuation of co-pending U.S. patent application Ser. No. 10/228,534, filed Aug. 27, 2002, entitled GPS NAVIGATION APPARATUS, which is hereby incorporated by reference in its entirety.

BACKGROUND OF THE INVENTION

1. Field of the Invention

The present invention relates to a GPS navigation apparatus, and in particular relates to improvement in a function when a new route is created by use of point data, which has been specifically inputted by an operator to be stored as tracking data, together with movement locus data sequentially obtained in a tracking mode.

2. Description of the Related Art

A two-dimensional or three-dimensional positioning system using a radio wave from a GPS (global positioning system) satellite has been developed, and widely used as a navigation apparatus for automobiles, vessels, or the like. The GPS navigation apparatus is, together with an intrinsic navigation function, provided at least with a tracking function and a routing function.

Here, the tracking function is a function for displaying a movement state as locus information while positioning it at an interval of unit distance or unit time, and for preserving the locus data recorded from the start point to the destination (final arriving point), while the routing function is a function to have the destination and a special point previously inputted and stored by an operator based on a map, PIO (point of interest) information, or the like, such that a route from the start point to the destination is established to be displayed and preserved. The tracking function is often also provided with a function to preserve specific points, which are made to be inputted by the operator during a movement process, together with the locus data.

For example, when the tracking function is utilized in hiking, fishing, etc. by use of a vessel, or the like, the specific point is rarely known previously, and thus a WAY-POINT (specific point on a movement route) or MARK-POINT (specific point off the movement route) is sequentially inputted for storing by a user during actual movement.

In particular, a location of a forked route, well-water, or the like, in hiking, and a location of good fishing ground or the like in fishing, are stored as the WAY-POINT, and the location of a fine view or a position of an iron tower, lighthouse, headland, or the like, which was off the route but useful as a landmark, are stored as the MARK-POINT, together with ordinary movement locus data, respectively, for preserving as an original hiking or fishing route.

The route preserved by use of the tracking function as described above often contains useless routes between the start point and the destination. In other words, concerning the hiking course, there is a case where the destination is reached after repeatedly losing a way on the way, and a fishing vessel may largely meander to search for a good fishing ground, and thus an additional distance due to the lost way or meandered navigation is also included in the preserved route. Accordingly, when return-way navigation is executed by use of the route data preserved in an outward trip, or when the destination is visited later again using the preserved route, the route including the useless route is displayed, and the navigation can be made only along the displayed route.

Contrarily, when a route is created by linearly connecting the WAY-POINTs in the route, the navigation excluding the useless route becomes possible, and therefore there is a model with such a new route creating function. If a new route is created by linearly connecting only the MARK-POINTs, the navigation for visiting only impressive points is possible.

However, because the tracking function and the routing function in the GPS navigation apparatus are intrinsically independent, in order to create a route linearly connecting only the specific points as described above, required procedures are that a multiplicity of the start points, specific points and destinations, which are preserved and registered by the tracking function, are to be displayed as listed point information, only necessary points are selected and extracted therefrom, and data of the respective extracted points are transferred to the routing function to create the new route.

Specifically, although a procedure to execute is that the start points, specific points and destinations are selected one by one on a point listed picture screen of the tracking function, and the selected data is transferred to established information in the routing function in the conventional model, there is a recent model which can register as many as 600 points, and when a multiplicity of the specific points are registered with respect to a variety of routes, the point listed picture screen should be scrolled from one point to another, and the route creating operation becomes extremely complicated and troublesome in combination also with switching procedures of the function picture screen.

In particular, when the return route without useless route needs to be urgently created in case of worsening of weather, imminent sunset, or the like, it is extremely inconvenient, and may become a factor causing a disaster, or the like.

SUMMARY OF THE INVENTION

The present invention is created with an object to provide a GPS navigation apparatus having a new function, provided thereon, which is capable of automatically creating by a simple operation, a route linearly connecting the start point, specific points and the destination from the route data preserved by the tracking function.

A first embodiment of the present application is to provide a GPS navigation apparatus for having a present position displayed on a display unit while receiving a GPS signal to store present position data in memory means at an interval of fixed movement distance or fixed time, and having the position data stored in the memory means as specific points when designation is given by point establishing means during the movement process, and capable of giving a track name to a group of time series data, composed of the movement locus data from the start point to the destination and position data of the specific points, for registering, comprising:

track designating means for having a previously registered track name displayed on the display unit for selecting and designating a desired track, route creation designating means for designating creation of a conversion route with respect to a track designated by the track designating means, data extracting means for extracting only position data of the start point, specific points and destination from data group of the designated track names based on designation by the route creation designating means, and interpolation data producing means for producing interpolation data linearly connecting positions indicated by data extracted by the data extracting means in the time series sequence, wherein, in a navigation mode, the conversion route to linearly connecting the start point, specific points and the destination by use of the interpolation data is displayed on the display unit for execution of the navigation.

According to one embodiment of the present invention, the position data of the respective points (inclusive of the start point and destination) can be collectively used as an object of the route creating function in a previously registered track unit, thereby conventional one-by-one selection of the respective points becomes unnecessary, and the route creating operation can be remarkably simplified.

In a second embodiment of the present application, the procedure before extraction of only the position data of the start point, specific points and the destination by the data extracting means is the same as the first invention; however, it is different in producing the shortest route thereafter.

In other words, route determining means are provided for deriving the shortest route from the start point to the destination passing through all the specific points based on the data extracted by the data extracting means, and interpolation data producing means for producing interpolation data linearly connecting the start point, specific points and the destination related to the shortest route derived by the route determining means, wherein, in the navigation mode, the shortest route by use of the interpolation data is displayed on the display unit for execution of the navigation.

Because the route created by the first embodiment is based on an established time series sequence of the specific points, the route between the start point and the destination is not necessarily the shortest. However, according to the second embodiment, because the route determining means previously determines the connection of the specific points to make the shortest route, and the route is displayed, the most reasonable route can be employed in the navigation of a case, or the like, where a return trip is hurried passing through the respective specific points.

It should be noted that although there are a WAY-POINT and a MARK-POINT as types of the specific points, there is a GPS navigation apparatus which can selectively establish them while moving.

In such an apparatus, when selection of either WAY-POINT or MARK-POINT is made for designation by the point establishing means, respective position data are stored in memory means with identification data, indicating any of the specific points, attached thereto, and time series data group composed of the movement locus data from the start point to the destination and the position data of the WAY-POINT and the MARK-POINT is given a track name for registration.

There, in a GPS navigation apparatus according to a third embodiment of the present application, are provided data extracting means in which a desired track name is selected and designated by track designating means, and creation of a conversion route is designated with selection of either WAY-POINT or MARK-POINT with respect to the track designated by the route creation designating means, and the position data of only the start point, one type of the specific points related to the selection and the destination from the data group of the designated track name based on the designation, and interpolation data producing means for producing interpolation data linearly connecting the positions indicated by the data extracted by the data extracting means in the time series sequence, wherein, in the navigation mode, a conversion route connecting the start point, specific points and the destination linearly by use of the interpolation data is displayed on the display unit for execution of the navigation.

According to the present invention, when the WAY-POINT and the MARK-POINT simultaneously exist in the designated track, either of them is selected, and the navigation along a route linearly connecting the start point, the specific points of the selected type and the destination in the established time series sequence can be executed in the same manner as the first invention.

Moreover, a fourth embodiment of the present application is to create the shortest route in the same manner as the second embodiment in the above-described third embodiment. Although the procedure before extraction of only the position data of the start point, the specific points of the selected type and the destination from the data group of the designated track name by the data extracting means is the same as the third embodiment, route determining means are provided for deriving the shortest route from the start point to the destination passing through all the specific points related to the selection based on the extracted data, and interpolation data producing means for producing interpolation data linearly connecting the start point, specific points and the destination related to the shortest route derived by the route determining means, wherein, in the navigation mode, the shortest route by use of the interpolation data is displayed on the display unit for execution of the navigation.

Accordingly, in the same manner as the second embodiment, the navigation along the shortest route connecting the start point, the specific points of the selected type, and the destination can be executed.

BRIEF DESCRIPTION OF THE DRAWINGS

FIG. 1(A) is an outside perspective view obliquely seen from the upper right and FIG. 1(B) is an outside perspective view obliquely seen from the upper left, of a portable type GPS navigation apparatus according to an embodiment.

FIG. 6 is a table showing contents of TRACK data stored in the RAM in a period from starting from the START POINT to arriving at the DESTINATION.

FIG. 9 shows a pop-up picture of RECALL MEMORY (A), a TRACK list picture (B), a pop-up picture of TRACK (C) and a picture for confirmation of a TRACK name and designation of conversion to ROUTE (D) displayed in the routing function mode.

FIG. 10 is a table showing contents of ROUTE data obtained from TRACK data of FIG. 6 in case where WAY-POINT is an object in the routing function mode.

FIG. 11 is a ROUTE picture in case where ROUTE is displayed based on the data of FIG. 10.

FIG. 12 is a table showing contents of ROUTE data obtained from TRACK data of FIG. 6 in case where MARK-POINT is an object in the routing function mode.

FIG. 21 is a table showing contents of ROUTE data in case where the shortest route is constructed with the WAY-POINT as an object based on the TRACK data related to the tracking picture of FIG. 15.

FIG. 22 is a table showing contents of ROUTE data in case where the shortest route is constructed with the MARK-POINT as an object based on the TRACK data related to the tracking picture of FIG. 15.

FIG. 23 is a POINT list picture.

DETAILED DESCRIPTION OF THE PREFERRED EMBODIMENTS

Figure 2:
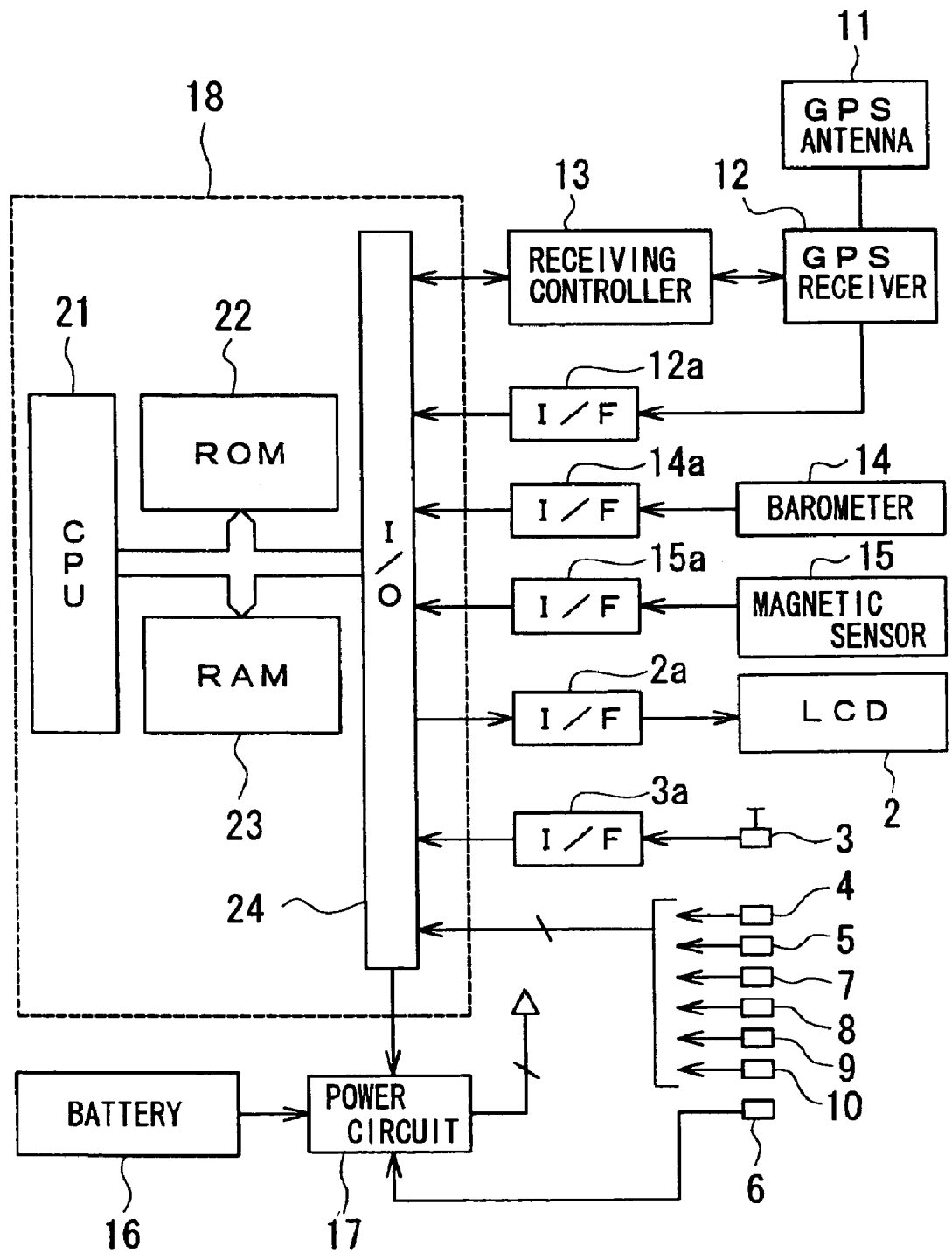
FIG. 2 is a system circuit diagram of the above-mentioned GPS navigation apparatus.

Hereinafter, embodiments of the present invention will be described in detail using the drawings.

Embodiment 1:

Firstly, FIGS. 1(A) and 1(B) are external perspective view, looked from the upside right and the upside left, respectively, of a GPS navigation apparatus relating to the embodiment.

A liquid crystal display unit (LCD) 2 is provided in the front of the apparatus 1, and a STICK key 3, an IN-key 4, and an OUT-key 5 are provided downside thereof, and a POWER key 6, a MENU key 7, a SAVE key 8 of a battery, and two PAGE keys 9, 10 are provided on the right and left sides thereof.

Then, a system circuit as shown in FIG. 2 is incorporated as a print wiring substrate or a module in a housing of the apparatus.

In FIG. 2, shown are a GPS antenna 11, a GPS receiver 12, a receiver controller 13 for controlling the receiver 12, a barometer 14, a geomagnetism sensor 15, a battery 16, a power source circuit 17, and a microcomputer circuit 18.

Here, the microcomputer circuit 18 has an ordinary configuration composed of a CPU 21, a ROM 22, a RAM 23, and an I/O port 24. A received signal by the GPS receiver 12 and a measured signal by the barometer 14 or geomagnetism sensor 15 are taken from the I/O port 24 into the microcomputer circuit 18 via interface (I/F) circuits 12a, 14a, and 15a, respectively.

Moreover, operation signals of respective keys 3 to 7, and 7 to 9, shown in FIG. 1, are inputted into the microcomputer circuit 18 via the I/O port 24 (signals of the STICK key 3 is inputted into the I/O port 24 via the I/F circuit 3a), and the POWER key 6 is designed to directly turn on/off the power source circuit 17.

In the ROM 22 of the microcomputer circuit 28, stored are programs related to a variety of functions of the tracking function, routing function, or the like, together with the intrinsic navigation function, and by appropriately operating each of the keys, the CPU 21 reads out pop-up data or function data on a screen to the I/F circuit 2a from the ROM 22 via the I/O port 24, and the images are displayed on the LCD 2.

In addition, in the navigation function or tracking function, as a matter of course, input data from the GPS receiver 12, barometer 14, or geomagnetism sensor 15 are stored in the RAM 23 for having the position information displayed on respective function picture screens based on such data.

In spite of a multiplicity of functions, in the present embodiment, the tracking function, routing function and navigation function related to the invention of the present application will be chiefly described.

(1) Tracking Function:

As described above, the tracking function displays locus information while positioning during movement and preserves locus data from the start point to the final reaching point (destination), and there are two cases of movement; one is movement after previously establishing the destination and specific points, and the other is movement without establishing the destination. Here, the latter case is described exemplifying the case where fishing is performed while navigating a vessel.

Figure 3:
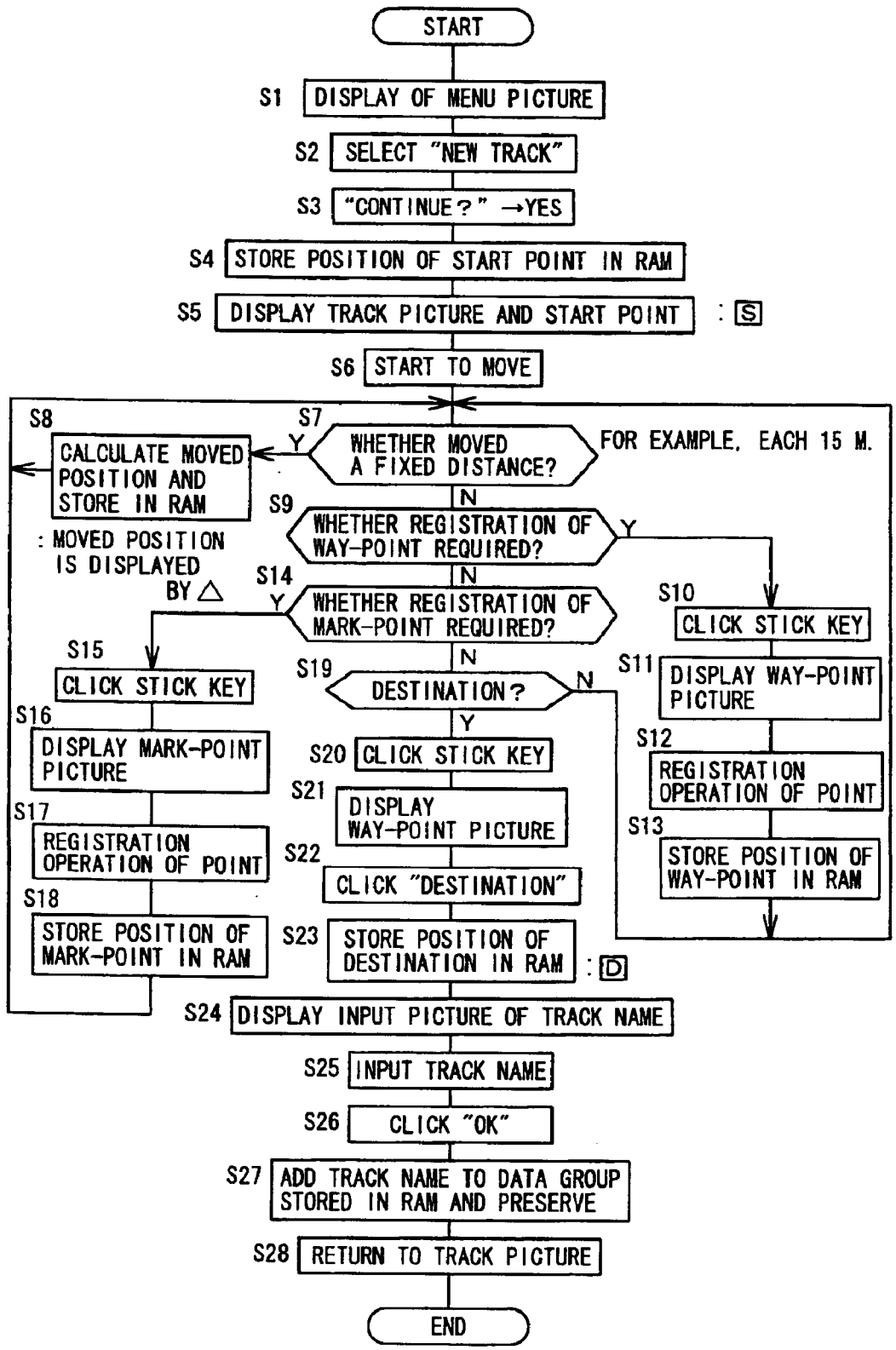
FIG. 3 is a flowchart showing manipulation and operational procedure in a tracking function mode.

Manipulation and operational procedure in the tracking function are shown in a flowchart in FIG. 3.

Figure 4:
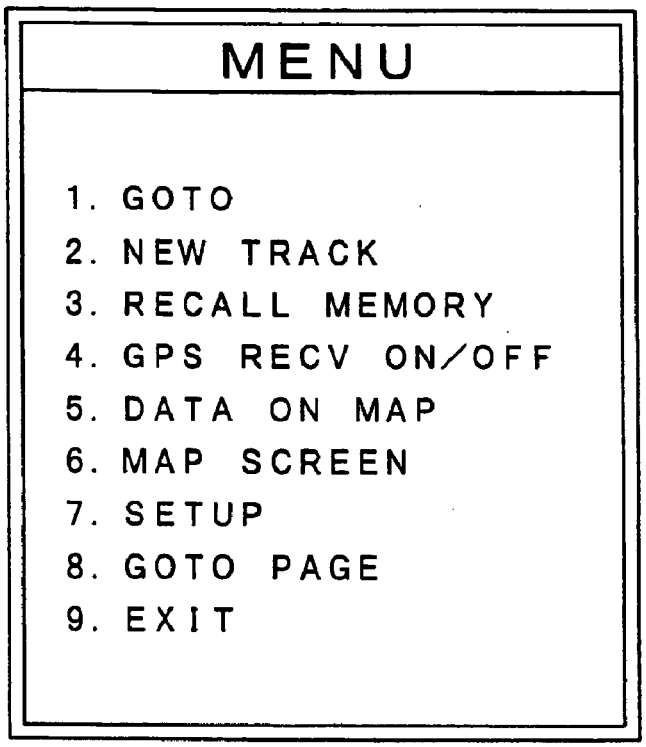
FIG. 4 is a MENU picture.

Firstly, when the MENU key 7 is turned on, a MEMU picture shown in FIG. 4 is displayed on the LCD 2, and when the STICK key 3 is slanted to select a "NEW TRACK" for clicking, a pop-up picture of "CONTINUE ?" is displayed, and a "YES/NO" inquiry is made. So, the STICK key 3 is clicked to select "YES" (S1 to S3).

Then, the CPU 21 stores the present position as "START POINT" in the RAM 23 based on data obtained from the GPS receiver 12, and the position is indicated as [S] in the tracking picture displayed on the LCD 2 (S4, S5).

The CPU 21 has been continuously calculating the movement position since the start of the navigation of the vessel, and every time movement of a fixed distance (for example, 15 m) is confirmed, position data at the time is stored in the RAM 23, and the moved locus is sequentially displayed on the LCD 2 (S7, S8 back to S7).

Furthermore, when clicking the STICK key 3 at a position where many fish were caught on the way of the navigation, picture for registration of a WAY-POINT is read out from the ROM 22 and displayed on the LCD 2, so that selection of a necessary icon leads to registration of the position as the WAY-POINT, and the CPU 21 stores the position data and icon data of the WAY-POINT in the RAM 23 based on the registration operation (S9 to S13 and back to S7).

When there are marks such as a lighthouse, headland, etc. even off the navigation route, the picture for MARK-POINT registration is read out by operating the STICK key 3, and designating the positions of the marks permits the positions to be registered as the MARK-POINTs with the icon data attached thereto, in the same manner as the WAY-POINT (S15 to S18 and back to S7).

When registering the WAY-POINT or MARK-POINT as described above, it is also possible to register therewith names and memo for the point. However, when such a procedure is not followed, a serial number is automatically given as the name.

Figure 5:
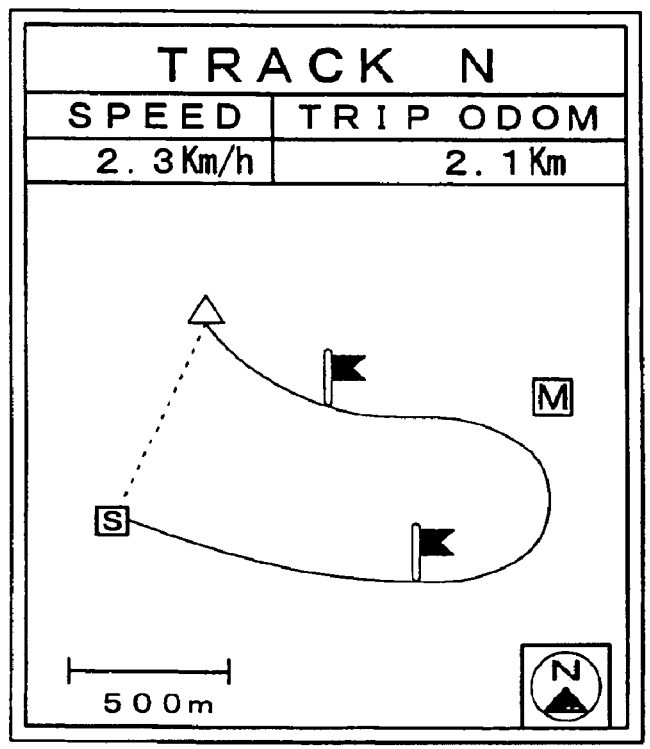
FIG. 5 is a tracking picture of a vessel during navigation.

Accordingly, if two WAY-POINTs and one MARK-POINT are registered during navigation for 2.1 km from the START POINT, a locus (wake) is displayed on the tracking picture screen in a manner as shown in FIG. 5. Because a flag icon has been selected for the WAY-POINT and [M] icon, for the MARK-POINT, the respective icons are displayed at each of the registration positions.

In registering the MARK-POINT, establishment of an approximate position of the MARK-POINT is easy because a navigational direction at the present time is shown by A in the tracking picture and the distance in the picture is indicated by a reference line segment.

Moreover, the picture screen can be scrolled by operating the STICK key 3 so as to appropriately slant, fundamental expansion/reduction on the display can be adjusted in a variety of ratios by returning to MENU screen (FIG. 4) by the MENU key 7 for selecting "DATA ON MAP," and in addition, operation of zoom-in/zoom-out of the present position can also be performed by the IN/OUT keys 3, and 4.

When reaching the final destination after registering some of the WAY-POINTs and MARK-POINTs, click the STICK key 3 (S19, S20).

Because the CPU 21 displays the screen for registration of WAY-POINT on the LCD 2 by this operation, clicking "DESTINATION" in screen leads to storing the position data of the DESTINATION and icon data of [D] in the RAM 23 (S22, S23).

Then, when the CPU 21 displays an input picture of the track name immediately on the LCD 2, the track name is inputted by operation of the STICK key 3 in the picture, and data group stored in the RAM 23 in the process from the START POINT to the DESTINATION is preserved under an inputted track name when "OK" is clicked, and thereafter, the process returns again to the tracking picture plane (S24 to S28).

As a result thereof, for example, provided six WAY-POINTs and three MARK-POINTs from the START POINT to the DESTINATION have been registered, time series data as shown in FIG. 6 are stored in the RAM 23.

Here, in "NAME OF POINT," although a point composed of TD and a serial number is a POINT which is measured at an interval of fixed distance (in this case, every 15 m), a point composed of WP and a serial number is a WAY-POINT, and a point composed of MP and a serial number is a MARK-POINT, LATITUDE data and LONGITUDE data which have been obtained from the GPS receiver 12 with respect to respective POINTs are stored in response each other, and altitude data based on data obtained from the barometer 14 is also stored.

Moreover, icons of [S] and [D] are automatically attached to the START POINT and the DESTINATION, respectively, and selected icons (in this case, a flag and [M]) are attached to the WAY-POINT and MARK-POINT, therefore respective icon codes are stored in ICON columns related to the POINTs.

Figure 7:
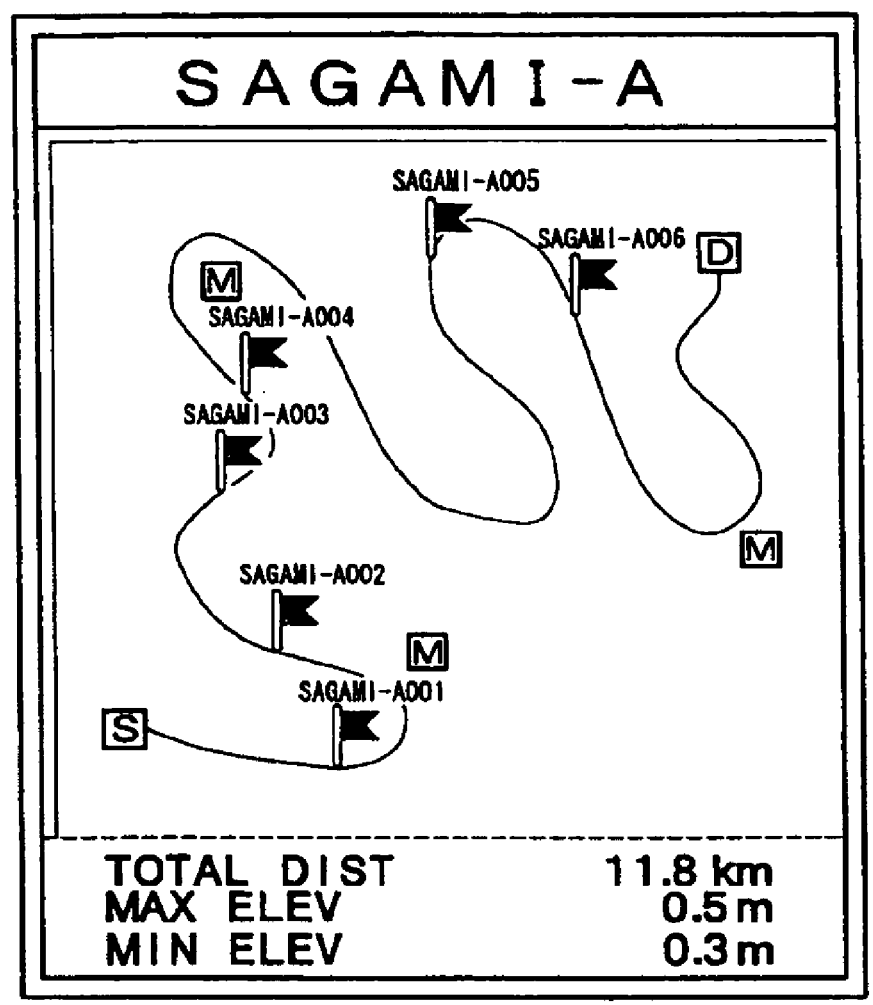
FIG. 7 is a tracking picture of an entire navigation track displayed based on the data of FIG. 6.

These data become as shown in FIG. 7 if displayed on the tracking picture screen, where the entirety of the wake of navigation from the state of FIG. 5 to DESTINATION [D] through continuous navigation can be seen. At the positions of the WAY-POINTs registered on the wake, the icons of flag are displayed, and the registered MARK-POINTs are also displayed as the icons of [M] at the positions relative to the wake.

It should be noted that, as the track is named "SAGAMI-A" in this embodiment, point names of "SAGAMI-A001" to "SAGAMI-A006" are automatically displayed at each WAY-POINT.

(2) Routing Function:

As described above, the tracking function enables registration of a navigation locus of a vessel in the RAM 23, however, navigating in the return trip using the same navigation locus registered in the outgoing trip is rare case, and in many cases in the return trip, desirable navigation is desired to tread the positions where the catch was favorable as is the above-described case of the WAY-POINT, or to pass through the vicinity of the MARK-POINT registered as a mark of fine view site, lighthouse, or the like.

However, in the navigation by a vessel, the vessel more often meanders its route to arrive at the DESTINATION as shown in FIG. 7, and when a return route is established by using the navigation locus of the outgoing trip, a wasteful navigation including unnecessary route is unavoidable, therefore it is more reasonable to establish a return route by linearly connecting the WAY-POINTs and/or MARK-POINTs.

For this problem, in the conventional GPS navigation apparatus, a POINT list picture plane as shown in FIG. 23 is displayed by a series of key operations for selecting one by one out of the previously registered POINTs (START POINT, WAY-POINT, MARK-POINT, DESTINATION), and operation for switching to the set POINT in the routing function has been performed, on the contrary, the operation becomes extremely complicated as described in connection with the conventional art, if the number of the POINTs increased.

In view of such problems, in the present embodiment, in addition to the route establishing program by individual POINT selection as described above, a program capable of establishing the route by designating the track name registered by the tracking function and converting collectively is previously provided in the ROM 22, and a route establishing along the above-described requirement is performed by a simple operation.

Hereinafter, procedure and operation thereof are described with reference to a flowchart shown in FIG. 8.

Firstly, when operating the MENU key 7 to turn on, a MENU screen in FIG. 4 is displayed on the LCD 2, and when "RECALL MEMORY" is selected to click by operation of the STICK key 3, a pop-up picture plane shown in FIG. 9(A) is displayed. Then, "TRACK" is selected to click by operation of the STICK key 3 (S31 to S35).

Then, the CPU 21 reads out the TRACK names registered in the RAM 23 by the tracking function, and the TRACK names are displayed in batch on the TRACK list picture as shown in FIG. 9(B) (S36).

When a TRACK name to be converted to the ROUTE is selected by operation of the STICK key 3 and clicked, all the track data related to the selected TRACK name are read out to display approximate their track (S37, S38). For example, if it is presumed that "SAGAMI-A" is selected in the TRACK list picture of FIG. 9(B), data shown in FIG. 6 is read out, and a TRACK picture shown in FIG. 7 is displayed.

Then, if the STICK key 3 is clicked, a pop-up picture of the TRACK shown in FIG. 9(C) is displayed, and if "EDIT" is selected and clicked by operation of the STICK key 3, the picture is switched to a picture for confirmation of the TRACK name and conversion designation to the ROUTE as shown in FIG. 9(D), and thus the TRACK name is first confirmed and then a "WAY-POINT" is selected and clicked from radio buttons of the "WAY-POINT" or "MARK-POINT" provided as selection object items by operation of the STICK key 3, and further "TRACK>ROUTE" is selected and clicked from the radio buttons of selection items of processing contents (S39 to S43).

Moreover, for confirmation, a pop-up picture of "CONTINUE?" is displayed to inquire "YES"/"NO" by the clicking, and thus "YES" is selected to be clicked (S44. S45).

Then, at this stage, the CPU 21 extracts data only of the START POINT, respective WAY-POINTs, and DESTINATION POINT from the track data of the selected TRACK for storing them in the RAM 23, and in addition, interpolation data connecting the points by straight line in the time series sequence is calculated and the data thereof is also stored in the RAM 23 (S46, S47).

For example, if the data registered as "SAGAMI-A" is selected as a TRACK name, ROUTE data as shown in FIG. 10 is produced from the track data shown in FIG. 6. Namely, a ROUTE connecting START, WP001, WP002, . . . WP006, and DESTINATION by straight line using the interpolation data is constructed.

Thereafter, by the CPU 21, the picture is backed to the pop-up picture of FIG. 9(C), however, if "EDIT" is chosen to be clicked by operation of the STICK key 3, the CPU 21 prepares display data based on the ROUTE data stored in the RAM 23 to transfer it to the LCD 2 for being displayed (S48, S49).

Displayed contents thereof are shown as ROUTE in FIG. 11 if they are related to the above-described "SAGAMI-A," and as clear in comparison with FIG. 7, all tracks meandered among the WAY-POINTs are converted into straight lines, useless routes are eliminated, and thus a ROUTE connecting the POINTs with straight lines is constructed.

The ROUTE data thus constructed can also be stored with a name as a new route.

Next, although the above-described routing function uses WAY-POINT, a ROUTE using the MARK-POINT can also be constructed.

Figure 8:
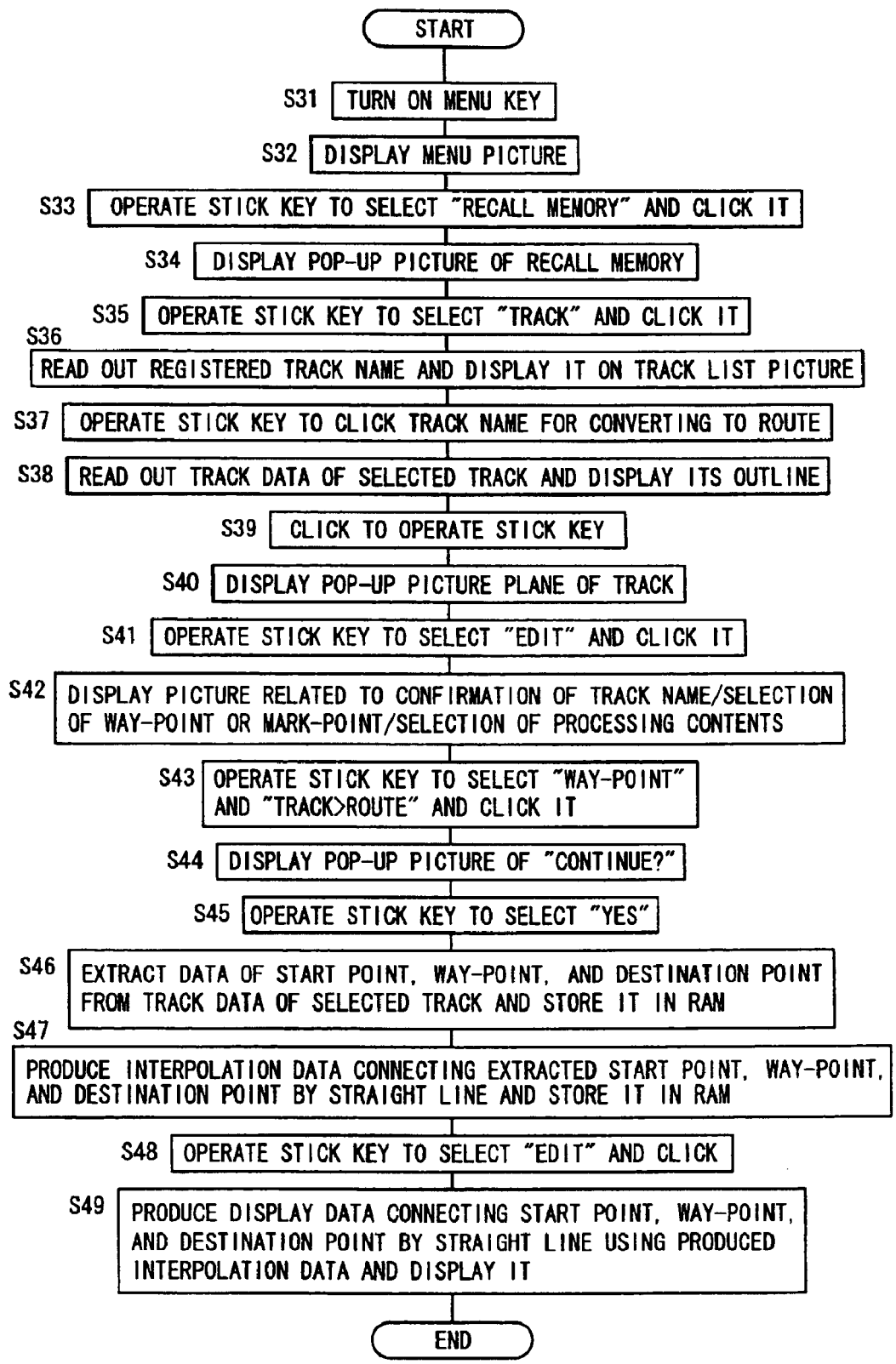
FIG. 8 is a flowchart showing manipulation and operational procedure in a routing function mode according to the embodiment 1.

In such a case, in the picture [FIG. 9(D)] for confirmation of the TRACK name and designation of conversion to the ROUTE displayed in Step S42 in FIG. 8, a radio button on the "MARK-POINT" side is chosen to be clicked as a chosen item, and then the "TRACK>ROUTE" is chosen from choice items of the processing contents.

Then, through the same procedure, the CPU 21 extracts only data of the START POINT, respective MARK-POINTs and DESTINATION POINT from the track data of the TRACK, for storing them in the RAM 23, and moreover calculates interpolation data which connect the points in the time series sequence with straight line for storing them in the RAM 23. In other words, in this case, not the WAY-POINT but the MARK-POINT is extracted and the interpolation data is calculated.

Then, if "EDIT" is chosen in the pop-up picture of the re-displayed TRACK, the CPU 21 prepares display data based on the above-described ROUTE data after the interpolation, and the display data is transferred to the LCD 2 for being displayed.

Figure 13:
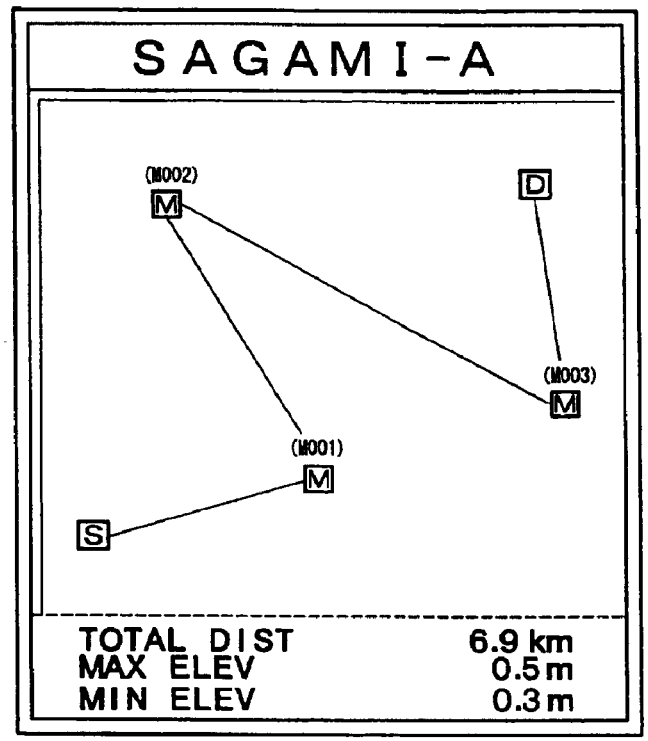
FIG. 13 is a ROUTE picture in case where ROUTE is displayed based on the data of FIG. 12.

In the same manner as the above-described WAY-POINT, in case of concerning the "SAGAMI-A," the ROUTE data as shown in FIG. 12 is derived, and the display contents with the LCD 2 show a ROUTE composed of straight lines connecting START, three MARK-POINTs, and DESTINATION in the time series sequence as shown in FIG. 13.

(3) Navigation Function:

The ROUTE constructed by the above-described routing function is used with the navigation function, and usage thereof is the same as that of the ROUTE ordinarily constructed.

Namely, a previously registered ROUTE is chosen and read out, and a user moves along the ROUTE while confirming by visual observation the present position and the direction displayed in the picture.

Figure 14:
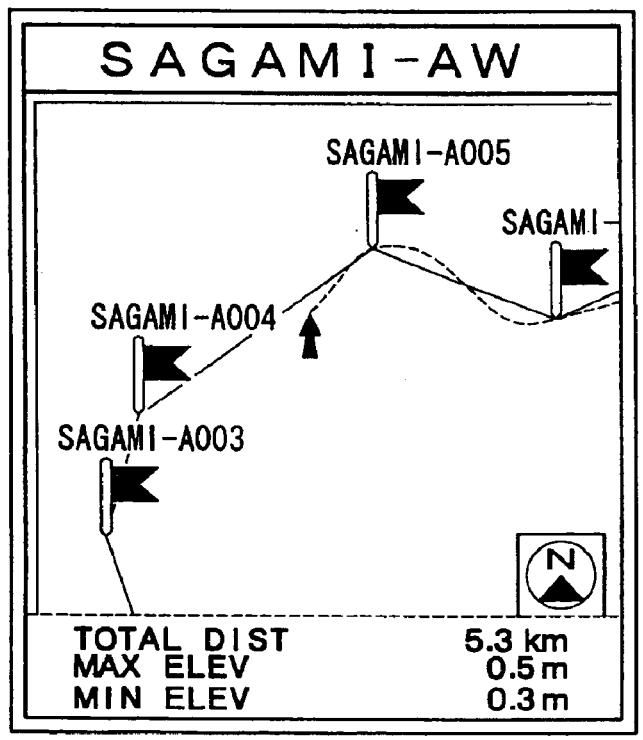
FIG. 14 is a picture (expanded picture) showing a state where navigation is performed based on ROUTE shown in FIG. 11.

For example, FIG. 14 shows a state where the ROUTE (named SAGAMI-AW) constructed using the WAY-POINTs as the objectives by the above-described routing function is enlarged and displayed by the LCD 2 for performing the navigation in the return trip. A vessel is navigated along the straight line displayed between the DESTINATION and the WAY-POINT, and the track thereof is indicated by a dotted line.

Furthermore, because the registered ROUTE can be read out at any time, it is also possible to set the ROUTE for directly returning from the DESTINATION to the START POINT as a return route for the day, and to navigate again in a later date in a navigation sequence of the START, WP001, WP002, . . . , WP006, to the DESTINATION by use of the ROUTE of the SAGAMI-AW.

The situation of a ROUTE constructed using MARK-POINTs as objectives is the same as shown in FIG. 13.

Embodiment 2:

Although the ROUTE provided in the above-described first embodiment is constructed by connecting the WAY-POINTs or MARK-POINTs located between the START POINT and the DESTINATION POINT by straight line, sequence for connecting the WAY-POINTs or MARK-POINTs is in accordance with the establishing sequence (time series sequence) in the tracking function. Accordingly, the ROUTE thereof is not always the shortest.

Figure 15:
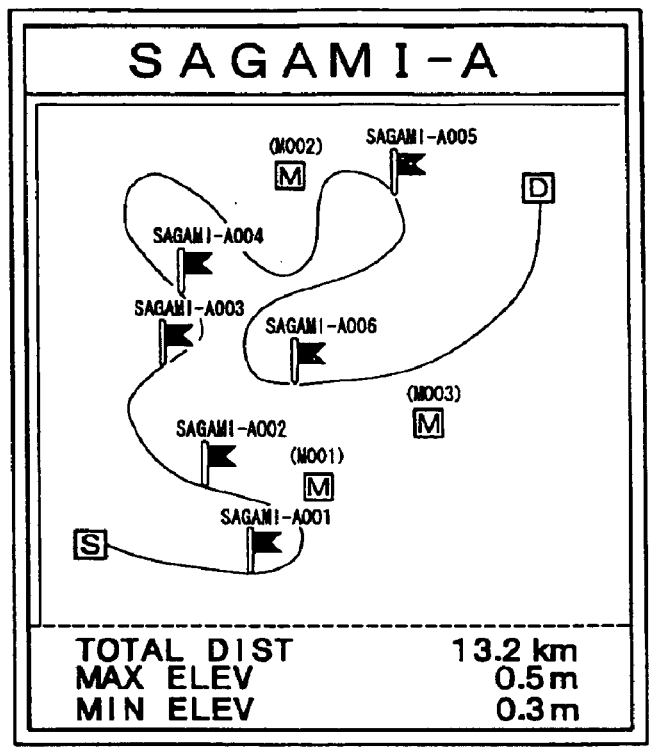
FIG. 15 is a tracking picture in case where an entire navigation track (navigation track more largely meandering than the case shown in FIG. 7) is displayed.
Figure 16:
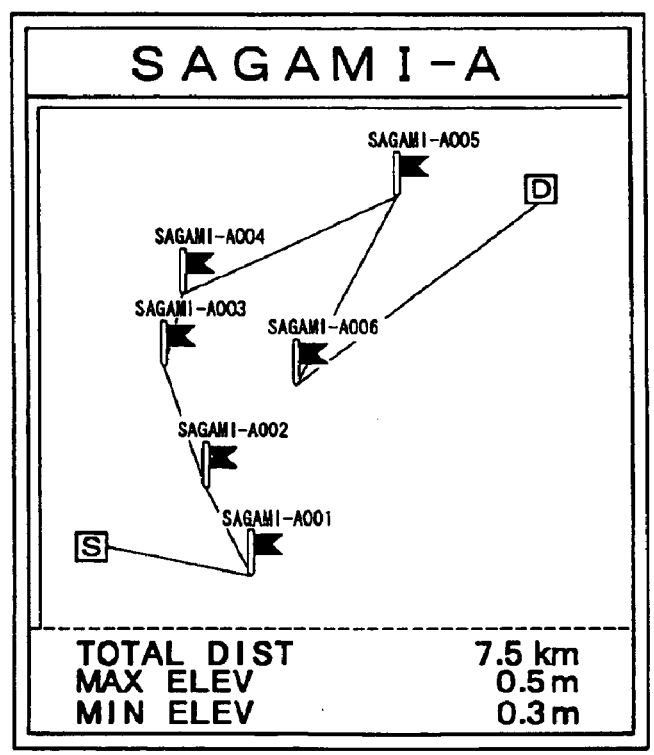
FIG. 16 is a ROUTE picture in case where routing is performed in accordance with an established time series sequence with WAY-POINT in the tracking picture of FIG. 15 as an object.
Figure 17:
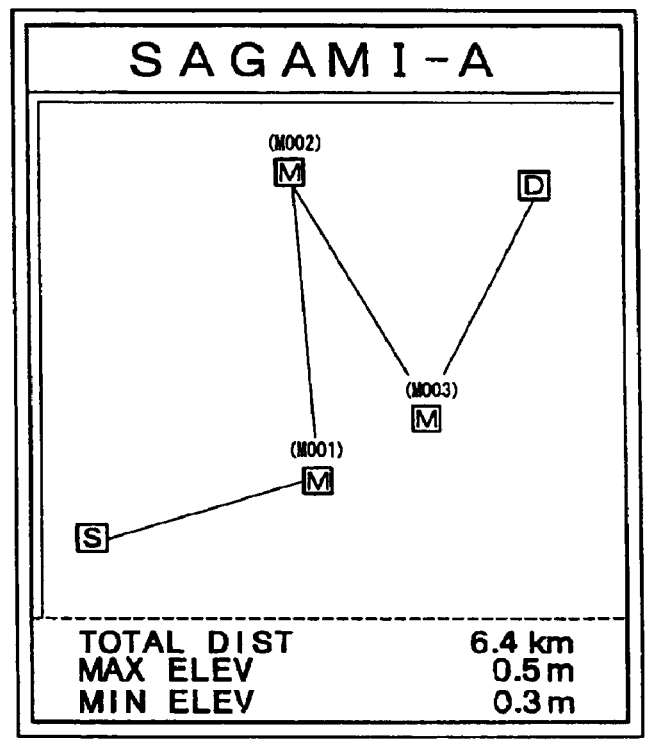
FIG. 17 is a ROUTE picture in case where routing is performed in accordance with an established time series sequence with MARK-POINT in the tracking picture of FIG. 15 as an object.

When the track obtained by the tracking function is more remarkably meandered than the case of FIG. 7 as shown in FIG. 15, the ROUTEs are constructed using the WAY-POINT and MARK-POINT as objectives with the routing function as shown in FIG. 16 and FIG. 17, respectively. However, the ROUTEs are not the shortest, and the ROUTEs shown in FIG. 18 and FIG. 19 correspond to the shortest routes.

On the other hand, in both cases returning from the DESTINATION POINT to the START POINT and going from the START POINT to the DESTINATION by use of the ROUTE registered later, the navigation is more often desired to be performed according to the ROUTE enabling the navigating in the shortest possible time, regardless of the sequence of the established specific points if the navigation can be performed by passing through all the points.

This embodiment accomplishes such requirement, and realizes a routing function by which the shortest route passing through all the specific points can be constructed.

However, the routing function can be realized in a software way by the data processing program of the ROM 22, and configuration of the system circuit of FIG. 2 is the same as the case of the first embodiment, and the operation procedure is not different as well.

A feature of the present embodiment is, in the flowchart shown in FIG. 8, that data of the START POINT, WAY-POINTs, and DESTINATION POINT are first extracted from the track data of the TRACK chosen in Step S46, operation for determining the shortest route is then performed, and the operation for preparing the interpolation data is performed based on the sequence related to the determined shortest route.

Hereinafter, the procedure related to the feature is described in detail by use of a flowchart shown in FIG. 20.

Firstly, about the extracted WAY-POINTs, a permutation being an order of arrangement thereof is calculated (S51).

In the case, when N WAY-POINTs have been established, there exist N! orders, and in case of the ROUTE of the above-described SAGAMI-AW, there exist six WAY-POINTs and 720 orders.

Next, an accumulated total distance of the ROUTEs from the START POINT to the DESTINATION passing through the respective WAY-POINTs is calculated in the sequence based on the individual permutation related to the WAY-POINTs (S52).

In the case, reasonably, individual distance among respective POINTs is previously calculated, and a value of the individual distance corresponding to N! ROUTEs respectively is selectively added to obtain the total distance.

Then, at a stage where respective total distances of all the ROUTEs are obtained, a ROUTE of total distance of the smallest value therein is obtained to be determined as the shortest route (S53).

Thereafter, in the same manner as the first embodiment, interpolation data for connecting the START POINT, WAY-POINTs and DESTINATION POINT in the determined shortest route by straight line is prepared and stored in the RAM 23, and the data is then transferred to the LCD 2 to be displayed (S54).

Figure 18:
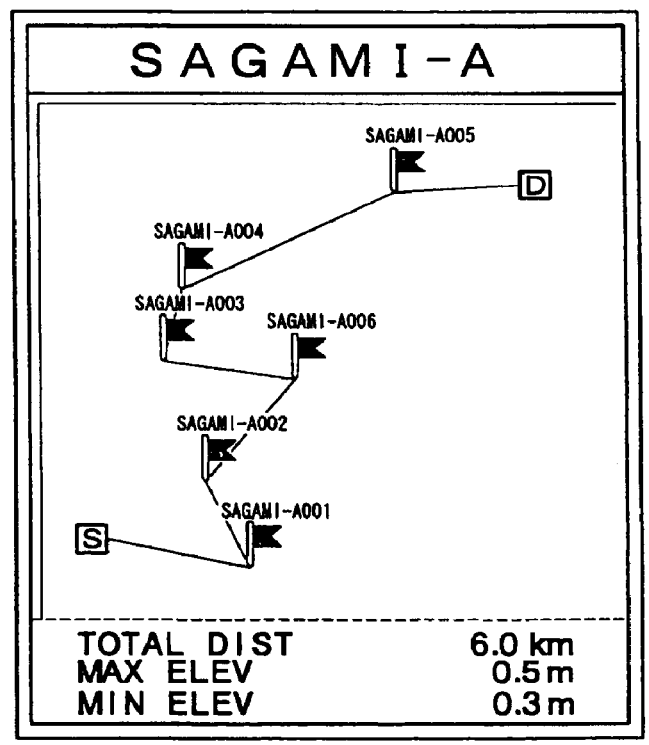
FIG. 18 is a ROUTE picture in case where the shortest route is composed with WAY POINT in the tracking picture of FIG. 15 as an object.

For example, in case of the ROUTE of the above-described SAGAMI-A, the ROUTE of START-WP001-WP002-WP06-WP003-WP004-WP005-\DESTINATION is determined as the shortest route out of the 720 ROUTEs, and thus the data to be stored in the RAM 23 is shown in FIG. 21, and as the result, a ROUTE shown in FIG. 18 is displayed.

Figure 19:
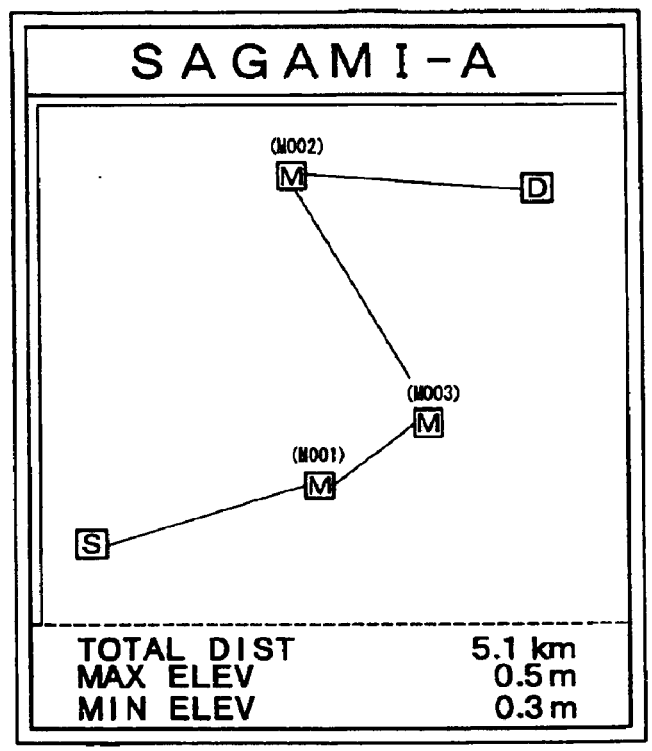
FIG. 19 is a ROUTE picture in case where the shortest route is composed with MARK-POINT in the tracking picture of FIG. 15 as an object.
Figure 20:
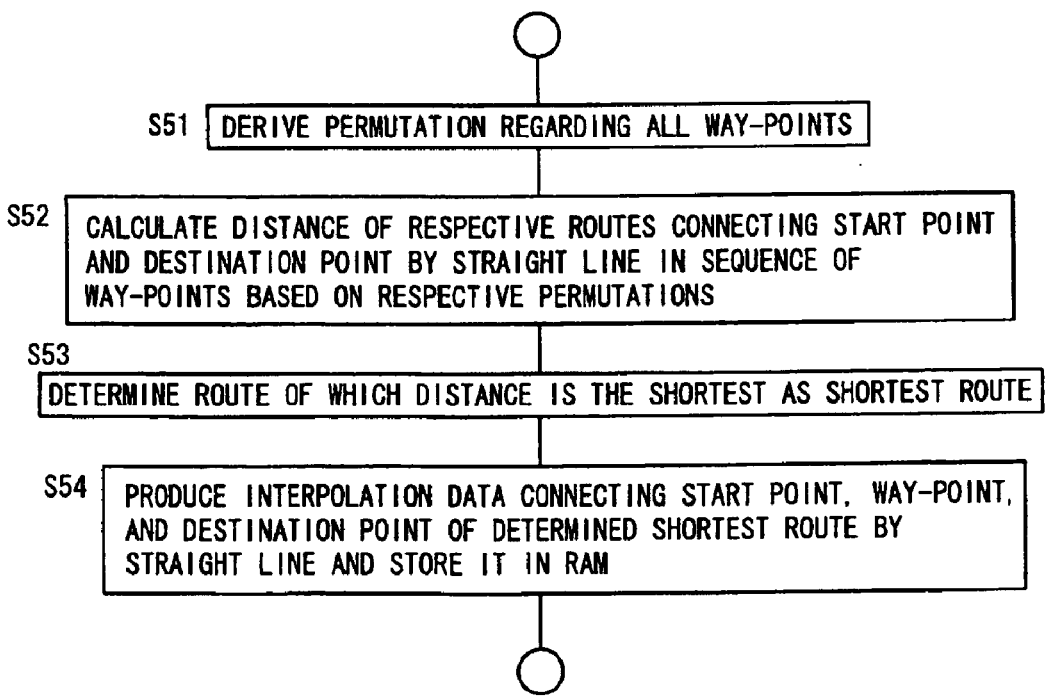
FIG. 20 is a flowchart showing the shortest route determining procedure and interpolation data producing procedure which characterize the embodiment 2. The procedures are limited to the case where WAY-POINT is an object.

The flowchart in FIG. 20 shows procedure in a case where the WAY-POINT is used as the objective. It is naturally possible that the shortest route is composed using the MARK-POINTs as objectives, and in this case, out of six (=3!) ROUTEs, a ROUTE of START-MP001-MP003-MP002-DESTINATION is determined as the shortest route, and thus the data stored in the RAM 23 become as shown in FIG. 22, and the ROUTE in FIG. 19 is displayed.

In the above-described respective embodiments, as shown in FIG. 8, although key operation of multiple times is required in the routing function, it is basically satisfactory if designation and selection of the TRACK name, choice of either "WAY-POINT" or "MARK-POINT," and designation of conversion to the ROUTE are made, and thus simplification of the key operational procedure can be made by configuration of a program, and if the program is configured as a system for converting only either one of the "WAT-POINT" or "MARK-POINT" to the ROUTE, an operation related to the choice of the type of the POINTs becomes unnecessary.

Moreover, in the respective embodiments, although explanations are given to cases of use for navigation of vessel, it can be applied in the same manner to cases where ROUTEs are constructed for hiking or automobile driving.

In the case where the apparatus is utilized in connection with automobile driving, because of being in a city, linear navigation between POINTs is often impossible. However, as generally the GPS navigation apparatus is equipped with an additional function for displaying an arrow-mark pointing the ROUTE side from the present position to guide a user, when the ROUTE converted in each of the respective embodiments is used, the navigation is performable more easily than the case where the ROUTE registered by the tracking function is used as it is.

Furthermore, in this embodiment, a portable type GSP navigation apparatus is explained. It goes without saying that the present invention is also applicable to an installing type apparatus.

The GPS navigation apparatus according to the present invention having the configuration described heretofore achieves the following results.

The subject invention is adapted to automatically construct a route connecting the start point, specific points and destination by straight line in accordance with the established time series sequence only by designating the previously registered track name and instructing construction of the route, and remarkably simplifies the procedure thereof in comparison with the conventional case where the registered specific points are chosen one by one to construct the route.

In particular, recently, although a GPS navigation apparatus capable of registering a multiplicity of specific points has been marketed, realization of the conversion in a batch to the route in the track unit is extremely effective in the practical operation.

Although the route constructed by one embodiment of the present invention is not always the shortest, a second embodiment of the invention makes it possible to automatically construct the shortest route connecting the start point, specific points and destination by straight line even if the specific points are established in whatever the sequence or at whatever the position, so as to make the practical operation more convenient.

Furthermore, the specific points in each of the aforementioned embodiments may be either of the WAY-POINTs or the MARK-POINTs.

Alternate embodiments provide an apparatus which can choose either the WAY-POINT or the MARK-POINT to use as an objective of the route construction, when the WAY-POINTs and the MARK-POINTs are mixed in the designated track.

What is claimed is:

1. A GPS navigation apparatus comprising:
    a GPS signals receiver for acquiring positional data;
    a memory for storing positional data comprising a locus of tracking points including a start point, a destination point, and a plurality of intermediary locations points;
    a registrar for storing and recalling a selected one of a loci of tracking points;
    a route conversion selector for selecting a conversion type from among a plurality of conversion types, for converting said selected locus of tracking points into a new return route, and wherein each new return route is dependent upon the conversion type;
    a position data extractor for automatically extracting those data from the selected locus of tracking points designated by the selected type of conversion and creating the new return route based on said automatic data extraction; and
    a display for graphically illustrating the new return route as a start point, a destination point, and new route data derived from said automatic data extraction.

2. The GPS navigational apparatus of claim 1 further comprising interpolating software for creating interpolated new route data information from said automatically extracted data, and incorporating said interpolated new route data into said new return route.

3. The GPS navigational apparatus of claim 2 wherein said interpolating software comprises a linear interpolation of tracking points.

4. The GPS navigational apparatus of claim 2 wherein said position data extractor extracts position data corresponding to a start point, a destination point, and user-selected intermediary points, and said route conversion selector includes a selection of a shortest route between said start point and said destination point, and passing through each of said user-selected intermediary points.

5. The GPS navigational apparatus of claim 4 wherein said interpolating software comprises a linear interpolation using the start point, the destination point, and the user-selected intermediary points.

6. The GPS navigational apparatus of claim 4 wherein said user-selected intermediary points are chosen points from the locus of tracking points.

7. The GPS navigational apparatus of claim 4 wherein said user-selected intermediary points are landmark data points distinct from said positional data.

8. The GPS navigational apparatus of claim 7 wherein said landmark data points are selected by displaying said tracking points with a graphical representation and entering on said graphical representation landmark locations distanced from said positional data.

9. The GPS navigational apparatus of claim 1 further comprising a timer for storing tracking points at a predetermined time interval.

10. The GPS navigational apparatus of claim 1 further comprising a distance determinator for storing tracking points at a predetermined separation distance.

11. The GPS navigational apparatus of claim 1 wherein the position data extractor extracts all of said positional data from said memory in creating said new return route.

12. The GPS navigational apparatus of claim 1 wherein the position data extractor extracts less than all of said positional data from said memory in creating said new return route.

* * * * *